R. C. KULDELL.
UNIVERSAL PLOTTING INSTRUMENT.
APPLICATION FILED JUNE 30, 1919.
1,321,924.
Patented Nov. 18, 1919.
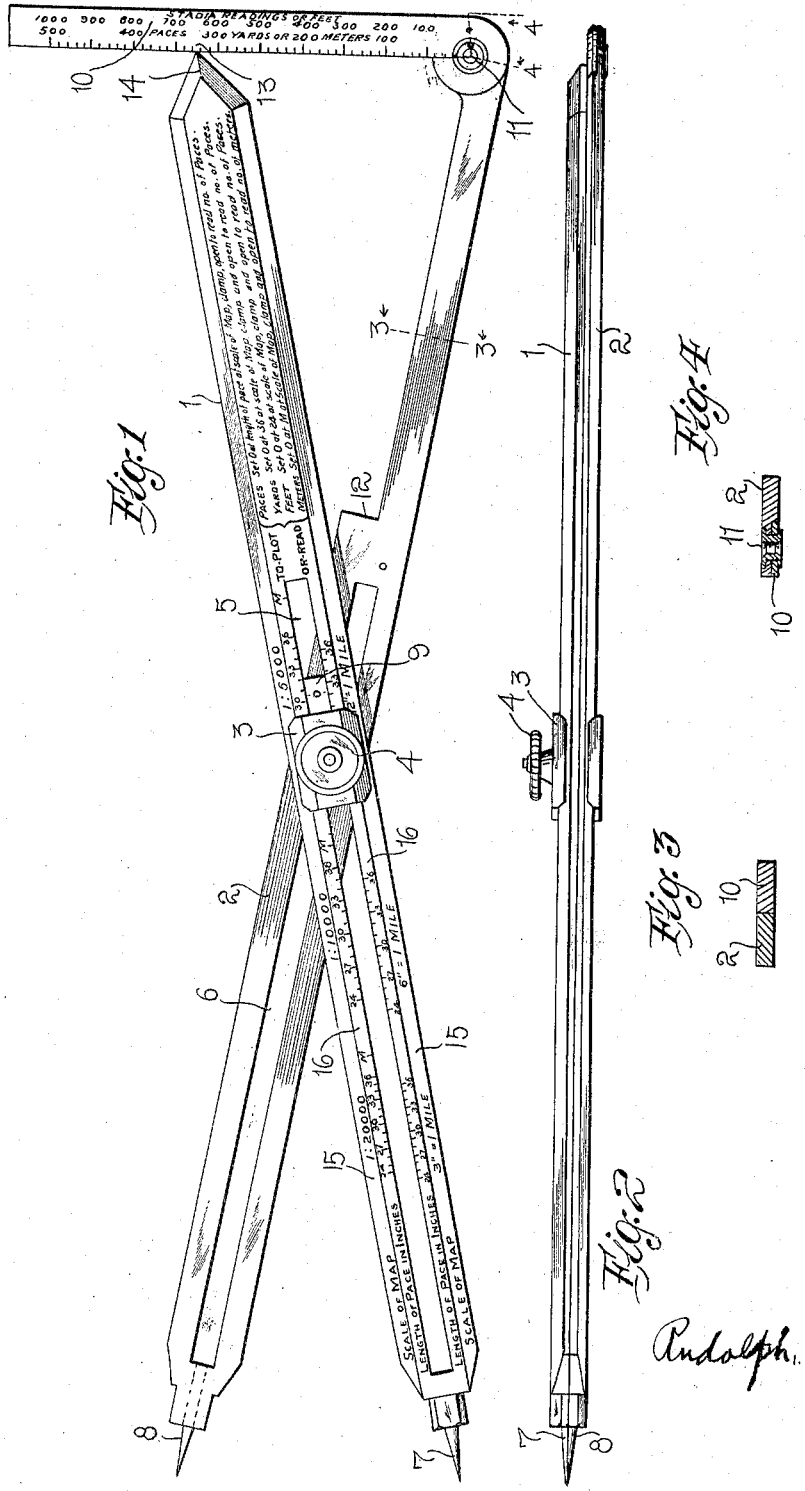
Inventor
Rudolph C. Kuldell

UNITED STATES PATENT OFFICE.

RUDOLPH C. KULDELL, OF THE UNITED STATES ARMY.

UNIVERSAL PLOTTING INSTRUMENT.

1,321,924.     Specification of Letters Patent.     Patented Nov. 18, 1919.

Application filed June 30, 1919. Serial No. 307,797.

(FILED UNDER THE ACT OF MARCH 3, 1883, 22 STAT. L., 625.)

*To all whom it may concern:*

Be it known that I, RUDOLPH C. KULDELL, Lieut. Col. Corps of Eng., a citizen of the United States, stationed at Washington, D. C., have invented an Improvement in Universal Plotting Instruments, of which the following is a specification.

The invention described herein may be used by the Government, or any of its officers or employees in prosecution of work for the Government, or by any other person in the United States, without payment of any royalty thereon.

This invention relates to a universal plotting instrument for use in military sketching in the field, where the sketcher has to depend on a few instruments, which must be easily carried and capable of withstanding rough usage. Formerly it has been impossible to plot or sketch with a high degree of accuracy with the instruments available, and one object of this invention is to provide a plotting instrument which meets the requirements as to usage in the field and which also enables the sketcher to plot distances on the sketch with a negligible error.

Another object of this invention is to provide an instrument which will enable a map reader to scale distance from the map with greater accuracy and facility.

It has been found that for a scale as large as 3″ to the mile, or even 6″ to the mile, the closest reading that can be obtained is about 25 paces, with the instruments now in use. With this device it is possible to read map distances to within two or three paces, this result being obtained by a magnifying effect which forms a feature of this instrument. The advantage to be gained in this connection will be readily understood.

Another advantage in the use of this plotting instrument is that its application is universal for all map scales now in use. It can be used to plot feet, yards or meters, or can be used to read feet, yards or meters from a map, with but one setting of the clamping device.

In the preferred form the device is compact and conveniently carried, having been designed to take its place as a part of the standard reconnaissance outfit in use in the United States Army.

For a clearer understanding of the invention reference is made to the accompanying drawings, in which—

Figure 1 is a plan view of one embodiment of the invention;

Fig. 2 is a side elevation of the device with the main legs closed;

Fig. 3 is a cross-sectional view (line 3—3 of Fig. 1) through one of the main legs, showing the small movable arm in its closed position;

Fig. 4 is a cross-sectional view substantially on the line 4—4 through the pivot of the small movable arm, but with the arm in its closed position.

In the device as shown there are provided two main legs, designated on the drawings as 1 and 2, held together by a pivot member 3, provided with a clamping nut 4. The pivot member 3 is mounted to be movable in slots 5 and 6, cut longitudinally in the legs 1 and 2, respectively. The pivot member 3 and clamping nut 4 are so constructed that when the nut 4 has been tightened the member 3 is prevented from sliding relative to the legs 1 and 2—that is, the point on which said legs pivot is fixed—but the legs 1 and 2 are not prevented from pivotal motion about member 3. The legs 1 and 2 are provided at one end with sharp points, 7 and 8. Attached to the pivot member 3 and movable with the member 3 along the slot 5 in the leg is a member 9, bearing a zero mark or index.

At the end of the leg 2, opposite to the point 8, is a movable arm 10, pivotally mounted by means of a pivot 11 on the center line of the leg 2. This arm is movable to fit in a recess 12, cut in the leg 2. Recess 12 is provided so that the arm 10 may be placed in a position of safety when the instrument is folded and not in use. The arm 10 is provided, along the inside edge, with graduations comprising a scale 13, divided into suitable units. The use of these graduations will be more fully explained hereinafter. The leg 1 is provided at the end thereof, opposite the point 7, with a point 14, which is designed to indicate readings along the scale 13.

The leg 1 is provided with two series of graduations, or scales 15 and 16, along the margins of slots 5. The series 15 designates values of map scales and series 16 the length of pace in inches.

The calculation of the size of the units of the various scales may be explained as follows. For the sake of convenience, the length of the leg 1, which may be called the index leg, may be made 10 inches from the tip of point 7 to the tip of point 14. The length of the leg 2 is also made 10 inches from the tip of point 8 to the center of pivot 11. The movable arm 10 is arbitrarily made 3 inches in length and divided into arbitrary units as shown on the sketch.

The graduations on index arm 1 are obtained as follows:

With 3" on the graduated arm 10 having been given a valve of 500 paces, then 100 paces will be equal to ⅕ of 3 or 0.6 inch. Now, in order that the lower points of the instrument may be separated a distance which shall correspond, on a map of 3" equals 1 mile scale, for instance, to 100 paces of a given length, it is necessary to set the pivot at such a point that in the similar triangles formed between the arms of the instrument, the bases shall be, respectively, 0.6 inch on the upper triangle and on the lower a length which represents 100 paces on the map.

Assuming again a map scale of 3 inches equals 1 mile, then, 1 mile ground=3" map.
1×12×5280 in. ground=63,360 in. ground=3" map.
1 in. ground=1/21,120 in. map.

The fraction 1/21,120 is the representative fraction of the map for the scale designated.

Now let $a$=the length of pace in inches, and

Let $b$=the representative fraction of the map.

From the assumption above 1 in. ground equals $b$ in. on the map.

Then 1 pace ground=$a.b.$ in. on the map.
And 100 paces ground=100 $a.b.$ in. map.

Now let X=the distance in inches from the point 7 on the index leg to the pivot.

Then 10—X=the distance in inches from the pivot to the point 14.

Then by similar triangles $$X:(10-X) = 100\ a.b:0.6$$

Solving $$X = \frac{1000\ a.b.}{.6 + 100\ a.b.}$$

This formula furnishes the basis for calculation of the distance from the point 7 of the location of the pivot and this distance, it will be noted, may be calculated for various pace lengths and map scales. It will be noted further that each distance is a matter of separate computation and it is not possible to obtain these values by proportion.

There have been placed on the leg 1, graduations for the following 6 map scales:
3"=1 mile.
6"=1 mile.
12"=1 mile.

Also scales with representative fractions of 1/20,000, 1/10,000, and 1/5,000.

For plotting feet on the first 3 map scales, the 24 in. pace is used, the readings on the movable arm being doubled. The 36" pace gives the readings in yards. For use in connection with the last three map scales, a point "M" has been marked indicating a pace 1 meter long.

Inasmuch as the pivot 3 cannot be satisfactorily used as a zero mark, a member 9 has been provided, attached to member 3 and movable slidably with it. Member 9 has located upon its surface a zero mark at a distance of ½ inch from the pivot, and all measurements therefore must be made from a point ½ an inch inside the point of the leg 1.

The directions for using the instrument are very simple and printed on the index leg 1. The sketcher determines by trial the average length of his pace and then sets the zero at the number indicating the length of his pace for the scale of the map he desires to plot. The pivot is then clamped and remains fixed as long as the same scale is to be used. To plot any number of paces up to 500 with the clamp fixed at the proper length of pace and scale of map, the index leg 1 is moved until a reading of the correct number of paces on the pace scale of the movable arm is obtained. The points of the instrument are then placed on the map and the distance between the points on the paper will be the correct map distance. To read the distance in paces between any two points on the map the legs are clamped, as described above, according to the scale of the map and the length of pace and the readings made on the scale of the movable arm.

It will be understood that the invention is not limited in this description to the measurements as given, and that the device is capable of use in various modifications, of which the preferred form is shown.

What I claim as new and desire to secure by Letters Patent is:

1. A plotting instrument having two divider legs, one of said legs provided with a recessed portion, a pivot connecting said legs and adjustable longitudinally thereon, and an arm pivoted on said leg and movable to enter the recessed portion of said leg.

2. A plotting instrument having two divider legs one of which is provided with graduations, a pivot connecting said legs and adjustable longitudinally thereon, a member mounted on said pivot and bearing an index, adapted to coöperate with said graduations.

3. A plotting instrument having two divider legs, one of said legs bearing a plurality of scales, a pivot connecting said legs and adjustable longitudinally thereon, a member mounted on said pivot, and an index on said member, adapted to coöperate with any desired scale on said leg.

4. A plotting instrument having two divider legs, one of said legs bearing a plurality of scales, a pivot connecting said legs and adjustable longitudinally thereon, a member mounted on said pivot, an index on said member adapted to coöperate with a predetermined scale on said leg, and an arm pivoted on said second leg, said leg being provided with means to protect said arm, when in the folded position.

5. A plotting instrument, having two divider legs, one of said legs bearing a plurality of scales, said leg terminating in an index pointer, a pivot connecting said legs and adjustable longitudinally thereon, a member mounted on said pivot, an index on said member adapted to coöperate with a predetermined scale on said leg, a graduated arm pivoted on said second leg, and a scale on said arm, said arm being movable to coöperate with the index pointer on said first leg.

6. A plotting instrument having two divider legs, one of said legs bearing a plurality of scales, a pivot connecting said legs and adjustable longitudinally thereon, said pivot being adapted to lock said legs against longitudinal movement in any desired relative position, but permitting free angular movement, a member mounted on said pivot, an index on said member adapted to coöperate with a predetermined scale on said leg, and a graduated arm pivoted on the other of said legs, said leg being constructed with a recess to protect said arm when in the folded position.

RUDOLPH C. KULDELL.